United States Patent [19]
Kouril et al.

[11] 3,866,442
[45] Feb. 18, 1975

[54] D.C. EXITATION ARRANGEMENT FOR A TEXTILE MACHINE PROGRAMMER

[75] Inventors: Oldrich Kouril; Jaroslav Knourek, both of Brno, Czechoslovakia

[73] Assignee: Vyzkumny a vyvojovy ustav Zavodu vseobecneho strojirenstvi, Brno, Czechoslovakia

[22] Filed: Jan. 12, 1972

[21] Appl. No.: 217,185

[52] U.S. Cl. ..................... 66/50 R, 66/140 S, 322/4
[51] Int. Cl. ..................... D04b 15/78, D04b 15/38
[58] Field of Search ........ 66/50 R, 50 B, 25, 154 A, 66/145 S, 140 S; 322/4, 28; 310/68 R; 290/40 R

[56] References Cited
UNITED STATES PATENTS

| | | | |
|---|---|---|---|
| 2,908,826 | 10/1959 | Oldenburger | 290/40 R X |
| 3,315,148 | 4/1967 | Grillo | 322/4 |
| 3,339,381 | 9/1967 | Schmidt | 66/50 R |
| 3,422,339 | 1/1969 | Baker | 310/68 R X |
| 3,571,657 | 3/1971 | Domann | 322/28 X |
| 3,572,059 | 3/1971 | Goadby | 66/140 S |

*Primary Examiner*—Wm. Carter Reynolds

[57] ABSTRACT

Improved performance of the electronics circuitry in a textile machine program controller is obtained by incorporating a semiconductor power rectifier in the motor instrumented DC exiter for the programmer.

A single phase AC generator, either of the synchronous or the asynchronous type, is driven by a shaft of a three-phase AC motor coupled to unregulated three-phase mains. The rectifier interconnects the output of the AC generator and the filter circuitry at the input of the program controller. If the AC generator is synchronous, a feedback path including a voltage regulator may also be coupled between the output of the rectifier and a separate exciting winding of the synchronous generator to provide improved regulation. If desired, a second semiconductor rectifier may be coupled to the output of the AC generator through a voltage transformer to energize the filter circuitry associated with an auxiliary power input of the digital circuitry in the programmer.

2 Claims, 3 Drawing Figures

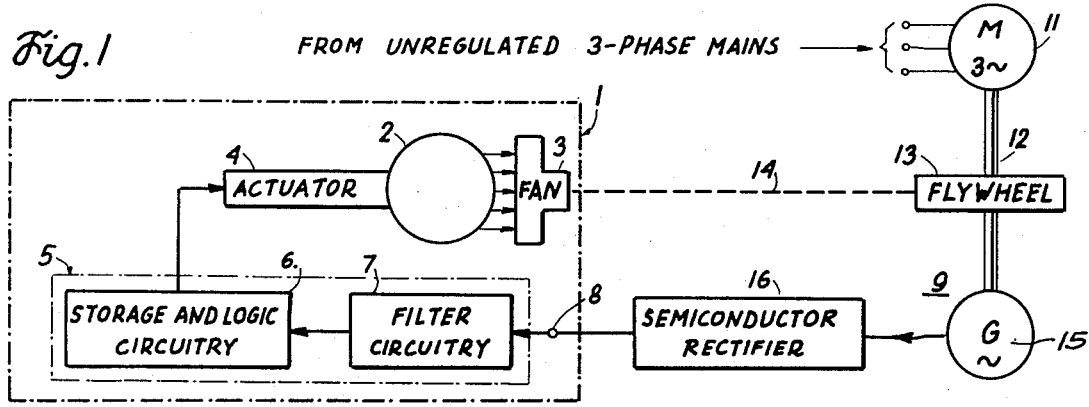
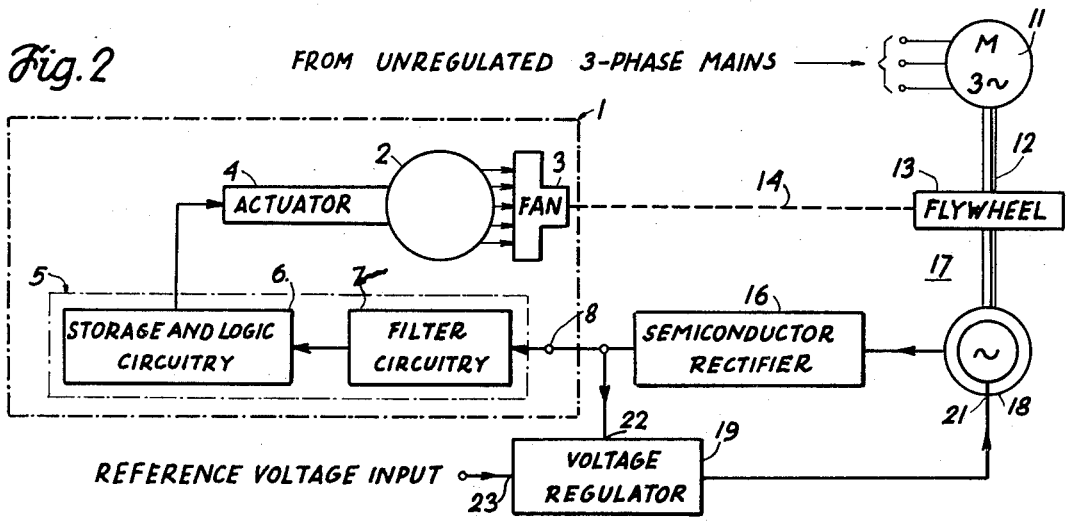
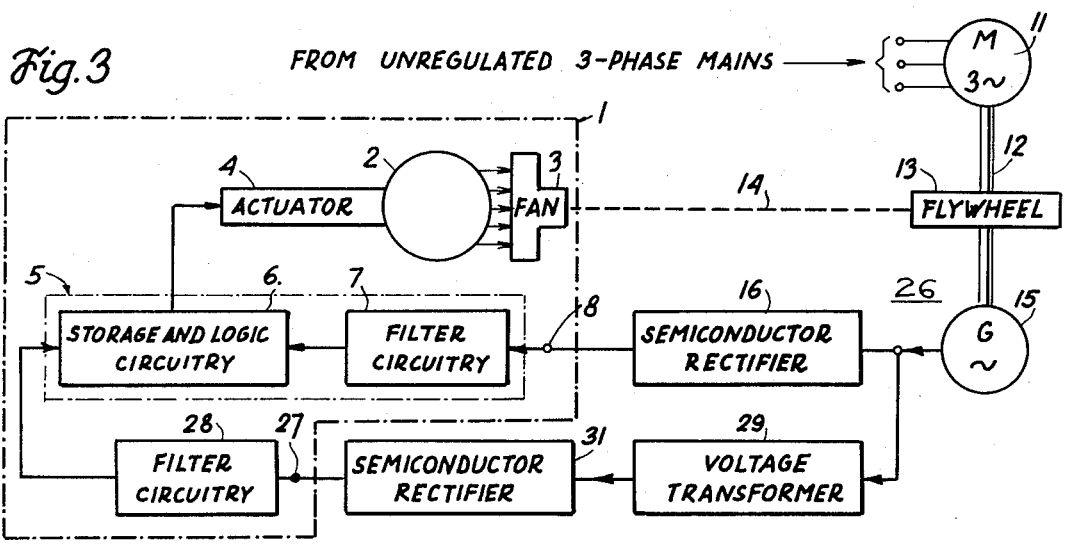

3,866,442

1

D.C. EXITATION ARRANGEMENT FOR A TEXTILE MACHINE PROGRAMMER

BACKGROUND OF THE INVENTION

Many large and complex textile machines, for example circular knitting machines, are now equipped with electronic programming devices such as addressable storage elements and the like. Such programmers selectively read out inpulses to activate an associated knitting system of the machine at a rate synchronized with that of the machine to control the pattern of the manufactured fabric.

In general, the DC power supplies for the electronic circuitry of such programmers must be well regulated. Such power supplies are often motor-instrumented and typically include a DC generator driven by a three-phase AC motor connected to an unregulated three-phase AC source. The output of the DC generator is coupled to filter circuitry associated with a DC power input of the programmer electronics.

In order to smooth out transients, a flywheel is generally mounted on the shaft of the 3-phase motor. Unfortunately, even with this refinement, it has been found that the undesirable AC components are introduced into the DC power input of the controller because of the effects of inevitable wear on the brushes and commutator rings of the DC generator, since such wear has the effect of reducing the efficiency of the contact rectification action by the DC generator. Such introduced AC components tend to bring about malfunctions in the programmer electronics and particularly in the digital circuitry of the programmer.

SUMMARY OF THE INVENTION

Such disadvantage may be overcome in accordance with the invention by means of an improved DC excitation arrangement for the electronic circuitry of the program controller. In an illustrative embodiment the flywheel-loaded shaft of the 3-phase AC motor connected to the unregulated AC source drives a single phase AC generator whose outut is rectified by a first semiconductor rectifier. The output of the first rectifier is in turn coupled to the filter circuitry associated with the DC power input of the program controller. The commutatorless rectification provided by this arrangement avoids the effect of brush and ring wear of the DC generator in the prior art, and in conjunction with the filter circuitry of the programmer provides constant, long-lasting regulation. Preferably, the flywheel may be coupled to an exhaust fan or similar means associated with the machine for removing stray filaments by suction during the manufacture of the fabric.

If desired, even better regulation may be provided by employing a synchronous AC generator between the three-phase motor and the input of the first rectifier. In this case differential-type voltage may be coupled in a feedback path between the output of the first rectifier and a separate exciting winding of the synchronous generator to stabilize the output of such generator at a value determined by a voltage applied to a reference input of the regulator.

Where different voltages are required for the main DC input to the programmer electronics and an auxiliary DC input thereof for supplying its digital circuitry, a voltage transformer may also be coupled to the output of the AC generator and a second semiconductive rectifier is coupled to the ouput of the voltage transformer for supplying the filter circuitry associated with such auxiliary DC input.

BRIEF DESCRIPTION OF THE DRAWING

Further characteristics of the invention are set forth in the following detailed description taken in conjunction with the appended drawing, in which:

FIG. 1 is a diagram of a motor-instrumented regulated power supply constructed in accordance with the invention for supplying the electronic circuitry of a textile machine programmer:

FIG. 2 is a pictorial diagram of a regulated power supply similar to that of FIG. 1 but employing a synchronous AC generator together with negative feedback.

FIG. 3 is a pictorial diagram of a regulated power supply of the general type shown in FIG. 1 but including two separate output lines for yielding regulated output voltages of different values.

DETAILED DESCRIPTION

Referring now to the drawing, FIG. 1 depicts schematically a textile machine 1, illustratively a circular knitting machine, whose mechanical portions may be of the general type described in the U.S. Pat. No. 2,173,488 issued to W. S. Tandler et al. The machine 1 has a rotary needle cylinder 2 on the periphery of which a plurality of jack-actuating needles (not shown) may be disposed for knitting a fabric. A fan 3 or similar exhaust means may be associated with the machine 1 for removing stray filamentary material from the knitted fabic by suction.

The jacks (not shown) may be actuated from a non-knitting position to a knitting position by means of a normally disabled electromagnetic actuator 4 which responds to the selective outpulsing of a knitting command from a programmer 5. The programmer includes suitable addressable storage and logic circuitry 6 which may be arranged in a conventional manner to generate the knitting commands at a rate synchronous with the rate of rotation of the machine bed 2. The programmer 5 also includes a suitable input filter network 7 which is excitable via a first DC input 8.

Since the structure and the operation of circular knitting machines of the general type depicted in FIG. 1 and generally known in the art, and since such structure and operation do not form a part of the instant invention, they will not be described further except where specifically relevant.

In accordance with the invention, it has been determined that improved performance of the storage and logic circuitry 6 be obtained with the DC excitation arrangement generally indicated at 9. A three-phase motor 11 is connected to the unregulated three-phase AC mains and is provided with an output shaft 12 that is loaded with a flywheel 13. The flywheel 13 is preferably coupled via a mechanical link 14 with the fan 3 so that the suction action of the latter is available for removing filamentary strands from the knitting machine 1 whenever the shaft 12 rotates. (not shown)

The flywheel-loaded shaft 12 drives 1 at a substantially constant speed, a single - phase AC generator 15 whose output is connected to a semiconductor rectifier 16. The combination of the AC generator 15 and the separate semiconductor rectifier 16 provides commutatorless rectification which avoids the effect of brush and ring wear of the DC generators employed in the prior art.

The output of the rectifier 16 is applied via the DC power input 8 to the filter circuitry 7, whose output is coupled to the storage and logic circuitry 6 to provide long-lasting, trouble-free regulation.

Enhanced regulation may be obtained by employing the DC exciting arrangement 17 illustrated in FIG. 2. The single phase asynchronous AC generator 15 of FIG. 1 is replaced in FIG. 2 by a synchronous AC generator 18 between the output of the flywheel-loaded shaft 12 and the input of the semiconductor rectifier 16, which as in FIG. 1 is coupled to the DC input 8 of the programmer, is also fed back via a differential-type voltage regulator 19 to an input 21 of the generator 18 associated with a separate exciting winding thereof. For this purpose, the output of the rectifier 16 is coupled to a first input 22 of the regulator 19, while a reference voltage from a suitable source (not shown) is coupled to a reference input 23 of the regulator 19. In a conventional manner, the voltage applied to the exciting winding of the generator 18 is proportional to the difference between the voltages applied to the inputs 22 and 23 of the regulator 19 and saves to maintain the output of the generator 19 constant, at a value determined by the voltage applied to the reference input 23.

In FIG. 3, another variation of the arrangement of FIG. 1 is shown which is useful where the textile machine programmer includes digital circuitry having a separate DC input that operates with an input voltage level different from that suitable for the main power input of the programmer. In this case the DC excitation arrangement (designated 26) is adapted to provide different voltages to the main DC input 8 of the programmer and to an auxiliary DC input 27 which may supply, e.g., the digital portion of the storage and logic circuitry 6 via a separate filter circuit 28. As in FIG. 1, the flywheel loaded shaft 12 of the 3-phase AC motor 11 drives the AC generator 15 whose output is coupled to the semiconductor rectifier 16. The latter is coupled as before to DC input 8 of the programmer. In addition, however, the output of the generator 15 is also coupled to the input of a conventional voltage transformer 29, whose output voltage is made compatible with the digital circuitry of the programmer electronics. The output of the transformer 29 is coupled to the input of a second semiconductor rectifier 31 which may be identical to the rectifier 16. The output of the rectifier 31 is in turn coupled through the auxiliary DC input 27 to the filter circuitry 28 associated with the digital circuits of the programmer, thereby providing long-lasting commutatorless regulation of the type indicated above.

It will be understood that the above-described embodiments are merely illustrative of the principles of the invention. Numerous other variations and modifications will now occur to those skilled in the art. Accordingly, it is desired that the scope of the appended claims are not to be limited to the specific disclosure herein contained.

What is claimed is:

1. In a textile machine of the type in which a programmer issues commands to selected actuators associated with one or more systems of the machine in timed relation to the operation of the machine to control the pattern of the fabric to be manufactured, in which the machine further includes exhaust means for removing filamentary imperfections from the manufactured fabric by means of suction and a DC excitation arrangement including generating means driven by an AC motor coupled to an unregulated 3-phase AC source and having a stabilizing flywheel on its shaft, and in which the programmer includes first filter circuitry that is accessible via a first DC power input thereof and is excited by the output of the DC excitation arrangement:

means for coupling the flywheel to the exhaust means for driving the latter when the AC motor is operated;

a single phase Ac generator coupled to the shaft for producing a substantially constant output voltage;

a first semiconductor rectifier coupled to the output of the AC generator; and means for coupling the output of the first rectifier to the first DC input of the programmer.

2. In a textile machine of the type in which a programmer issues commands to selected actuators associated with one or more systems of the machine in timed relation to the operation of the machine to control the pattern of the fabric to be manufactured, in which the machine further includes exhaust means for removing filamentary imperfections from the manufactured fabric by means of suction and a DC excitation arrangement including generating means driven by an AC motor coupled to an unregulated three-phase AC source and having a stabilizing flywheel on its shaft, and in which the programmer includes filter circuitry that is accessible via a DC power input thereof and is excited by the output of the DC excitation arrangement:

means for coupling the flywheel to the exhaust means for driving the latter when the AC motor is operated;

a synchronous generator having a separate exciting winding;

means for coupling the shaft of the AC motor to the synchronous generator;

a semiconductor rectifier coupled to the output of the synchronous generator;

a voltage regulator having first and second inputs and output which varies in accordance with the difference between voltages applied to the first and second inputs;

means for coupling a reference voltage to the first input of the voltage regulator;

means for coupling the output of the rectifier to the second input of the voltage regulator;

means for coupling the output of the voltage regulator to the exciting winding of the synchronous generator for providing a substantially constant voltage at the output of the rectifier; and means for coupling the output of the rectifier to the DC power input of the programmer.

* * * * *